United States Patent
Leber

(10) Patent No.: US 8,976,197 B1
(45) Date of Patent: Mar. 10, 2015

(54) SOLUTION GENERATING DEVICES AND METHODS

(71) Applicant: Mike Leber, Fremont, CA (US)

(72) Inventor: Mike Leber, Fremont, CA (US)

(73) Assignee: Hurricane Electric LLC, Fremont, CA (US)

( * ) Notice: Subject to any disclaimer, the term of this patent is extended or adjusted under 35 U.S.C. 154(b) by 0 days.

(21) Appl. No.: 13/773,529

(22) Filed: Feb. 21, 2013

(51) Int. Cl.
*G09G 5/00* (2006.01)
*G06K 9/00* (2006.01)
*G06T 19/00* (2011.01)

(52) U.S. Cl.
CPC .................................... *G06T 19/006* (2013.01)
USPC .......................................... 345/633; 382/103

(58) Field of Classification Search
None
See application file for complete search history.

(56) References Cited

U.S. PATENT DOCUMENTS

| | | | |
|---|---|---|---|
| 2002/0023064 A1* | 2/2002 | Grimse et al. ................... | 706/19 |
| 2002/0156866 A1* | 10/2002 | Schneider ..................... | 709/218 |
| 2002/0196277 A1* | 12/2002 | Bushey et al. ................. | 345/745 |
| 2004/0044516 A1 | 3/2004 | Kennewick et al. | |
| 2005/0289124 A1 | 12/2005 | Kaiser et al. | |
| 2006/0218117 A1 | 9/2006 | Gupta | |
| 2008/0294637 A1* | 11/2008 | Liu .................................... | 707/6 |
| 2009/0083205 A1* | 3/2009 | Dishongh et al. ............... | 706/46 |
| 2009/0197232 A1* | 8/2009 | Couch et al. ................... | 434/322 |
| 2010/0246784 A1* | 9/2010 | Frazier et al. .............. | 379/88.13 |
| 2012/0130978 A1 | 5/2012 | Li et al. | |
| 2012/0197857 A1* | 8/2012 | Huang et al. .................. | 707/706 |
| 2012/0253836 A1* | 10/2012 | Nolte et al. ....................... | 705/2 |
| 2013/0083063 A1* | 4/2013 | Geisner et al. ................ | 345/633 |
| 2013/0097664 A1 | 4/2013 | Herz et al. | |

OTHER PUBLICATIONS

"Visual Shelf Monitoring", http://web.archive.org/web/20120313094349/http://mathecsys.com/visual-shelf-monitoring/ available since Mar. 13, 2012.*

"The Millennium Problems", available since 2003, downloaded @http://www.amazon.co.uk/The-Millennium-Problems-Greatest-Mathematical/dp/0465017304.*

* cited by examiner

*Primary Examiner* — Xiao M. Wu
*Assistant Examiner* — Yingchun He
(74) *Attorney, Agent, or Firm* — Carr & Ferrell LLP

(57) ABSTRACT

Solution generating devices and methods are provided herein. Exemplary devices may execute logic via one or more processors, which are programmed to capture a view with an image capturing device, evaluate the view to determine a task within the view, generate a solution for the task, and display the solution via a display device.

17 Claims, 5 Drawing Sheets

SOLUTION GENERATING DEVICES AND METHODS

FIELD OF THE PRESENT TECHNOLOGY

The present technology relates generally to providing solution generating devices and methods. Generally, a device may facilitate problem solving by capturing an image of an object. The device is capable of evaluating the image to determine a problem, a query, and/or other solvable proposition or task included in the image file. The device may provide a solution to the proposition by displaying the relevant solution on a display device, which may include displaying the solution on the image itself, proximate to the proposition.

BACKGROUND

Executable applications for mobile devices, such as cellular phones, allow a user to capture images of objects such as QR (Quick Response) codes or bar codes. In the case of QR codes, the application deciphers content included in or reference by, the object. When scanned and processed, the content provided to the end user relative to these technologies is limited to descriptive information about the objects to which the barcodes are affixed, or may include messages embedded into the scanable object. Additionally, systems and methods that provide augmented reality features are known, but these systems and methods suffer from the same drawbacks as those associated with the display of content for QR and bar codes.

SUMMARY OF THE PRESENT TECHNOLOGY

According to some embodiments, the present technology may be directed to a device that comprises: (a) one or more processors; and (b) logic encoded in one or more tangible media for execution by the one or more processors and when executed operable to perform operations comprising: (a) capturing a view with an image capturing device; (b) evaluating the view to determine a task within the view; (c) generating a solution for the task; and (d) displaying the solution via a display device.

According to other embodiments, the present technology may be directed to a device that comprises: (a) one or more processors; and (b) logic encoded in one or more tangible media for execution by the one or more processors and when executed operable to perform operations comprising: (a) tracking a focus of an eye of a user to determine a section of a view being looked at by the user, the view being determined by an image capturing device; (b) capturing the section of the view being looked at by the user via the image capturing device; (c) evaluating the section of the view to determine a task within the section; (d) generating a solution for the task; and (e) displaying the solution via a display device.

According to additional embodiments, the present technology may be directed to a method that comprises: (a) capturing a view with an image capturing device; (b) evaluating the view to determine a task within the view; (c) generating a solution for the task; and (d) providing the solution to an end user.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

Figure 1:
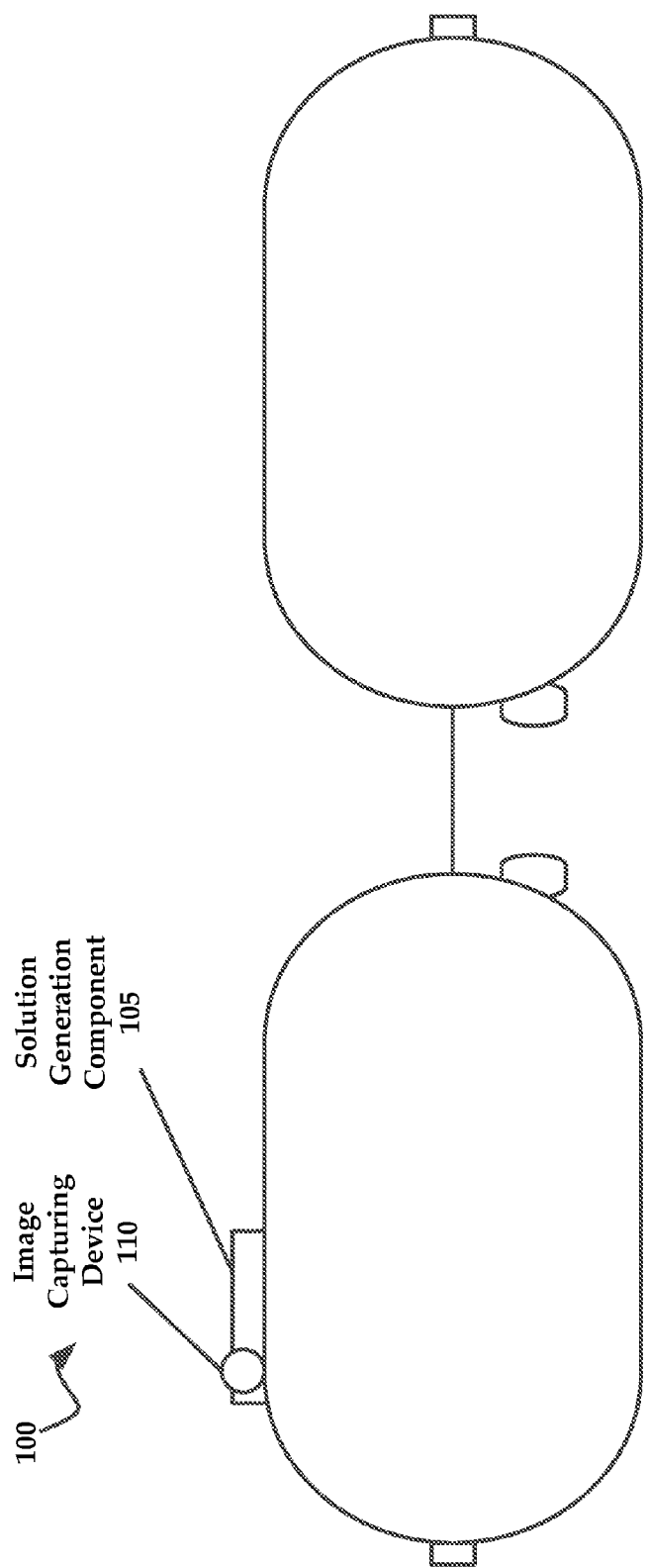
FIG. 1 is a front elevation view of an exemplary device in which embodiments of the present technology may be practiced.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the present technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally, the present technology may include systems and methods that generate solutions for tasks. More specifically, but not by limitation, the present technology may be utilized to capture visually discernible problems or tasks, such as word problems, syllogisms, analogies, and other logic-based problems, as will be described in greater detail herein. While the problems, tasks, or propositions to be solved may include a wide variety of subject matters, these propositions will be generally referred to as a "task" for the sake of brevity and clarity.

Tasks may be captured and analyzed using a camera, glasses, or other image capturing technology. Solutions can be displayed to the end user using the same device used to capture the problem (e.g., heads up display or glasses). In some embodiments, solutions can be displayed on an entirely different display device, or may be overlaid upon the view that is captured by the device, similarly to augmented reality.

In some instances, the present technology may provide solutions to tasks in various source languages and/or provide solutions to tasks that include math notation or geometric diagrams.

In some embodiments, the present technology may display or otherwise provide ancillary task/solution information such as showing steps for solving the problem, and if possible, provide more than one method used to solve the task. These and other objects of the present technology will be described with reference to the drawings.

FIG. 1 is a block diagram of an exemplary device 100 in which embodiments of the present technology may be practiced. In some instances, the device 100 may comprise intelligent glasses, a cellular telephone, a tablet computer, or any other device that is capable of capturing views of objects, as well as displaying the captured views via a display device. Generally, a view may include, for example, a capture of an image or images via a camera or video recording application. A view may comprise a plurality of visual features that may be recognized by the present technology.

The device 100 is shown as comprising a solution generation component 105, which comprises an image capturing device 110. The image capturing device 110 includes a camera, although any device capable of capturing an image, such as a scanner may also likewise be utilized in accordance with the present technology.

In general, the solution generation component 105 may comprise one or more processors, along with memory for storing logic that is executed by the one or more processors. The solution generation component 105 may include one or more of the components of the computing device 500 described in greater detail relative to FIG. 5, such as the one or more processors 510 and the main memory 520.

Figure 2:
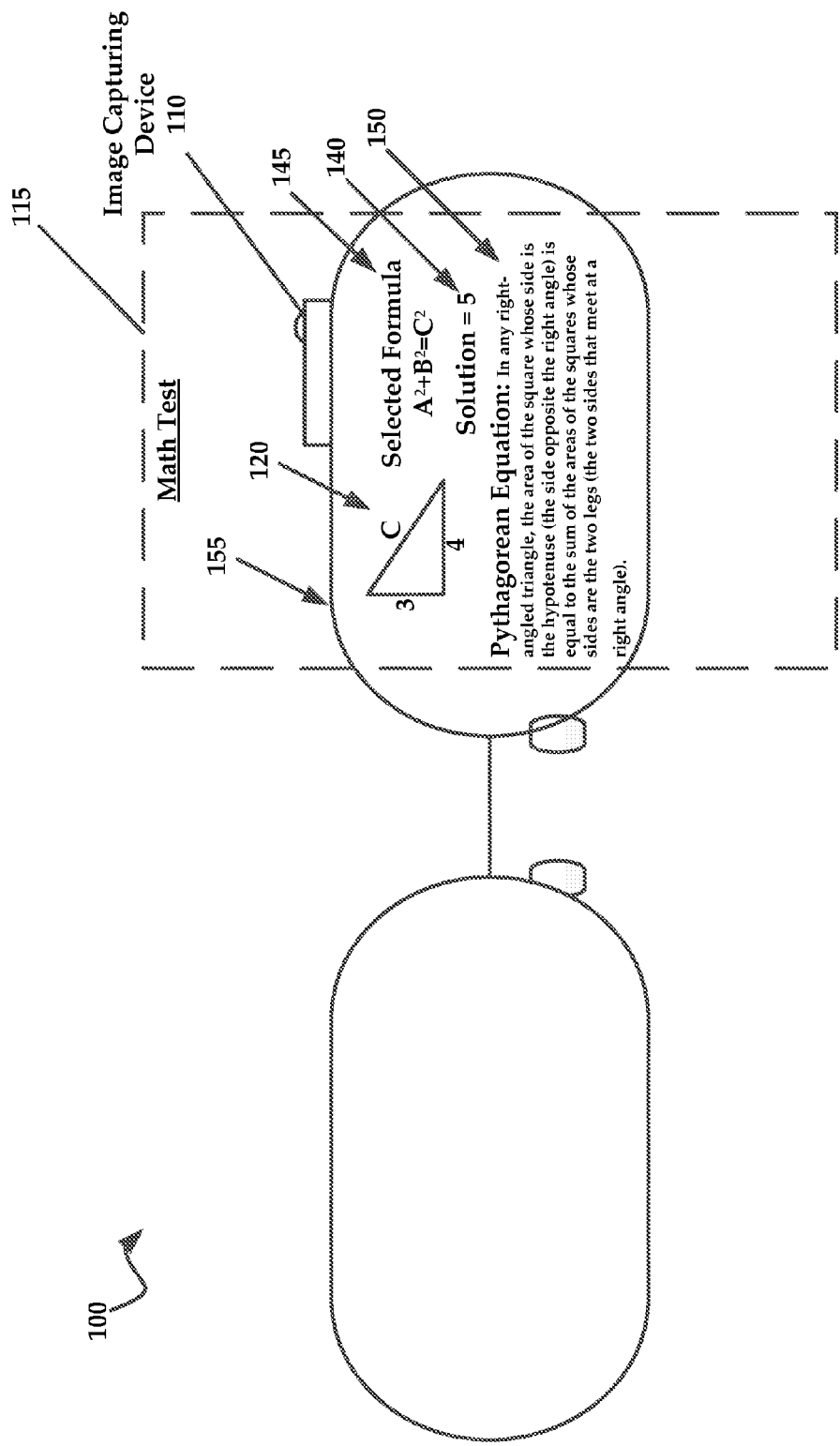
FIG. 2 is a rear elevation view of an exemplary device in use.

According to some embodiments the logic stored in the memory of the solution generation component 105 may be executed by the one or more processors to perform operations that comprise capturing a view with an image capturing device 110. An exemplary view captured by the image capturing device 110 is shown in FIG. 2. When viewing a math test 115, the view captured by the image capturing device 110 may include only the content of included in the view, such as a task 120. In this example, the task 120 includes a mathematical problem, which requires the user to solve a visual problem of determining a length of a hypotenuse of a right triangle.

Once the view has been captured, the logic may be executed to perform operations comprising evaluating the view to determine a task within the view. In this instance, the solution generation component 105 may perform a wide variety of processes on the view to determine the contents thereof. For example, the solution generation component 105 may utilize optical character recognition or pattern recognition to the view. One of ordinary skill in the art will appreciate that many processes to evaluating the content included in a view may be utilized in accordance with the present technology. Ultimately, the solution generation component 105 should be capable of determining one or more tasks included in the view.

A task may also comprise more input that the information gathered from evaluating the view captured by the image capturing device 110. For example, if the user is viewing a stock chart for a particular stock, the user may also speak a query, such as "display a thirty day moving average line for this stock." Using the combination of the stock symbol or chart provided in the view, along with the spoken query, the solution generation component 105 may generate a solution that includes a stock chart showing a thirty day moving average trend line, which is overlaid onto the stock chart. Thus, the solution generation component 105 may utilize natural language processing methods to evaluate spoken commands.

Figure 3:
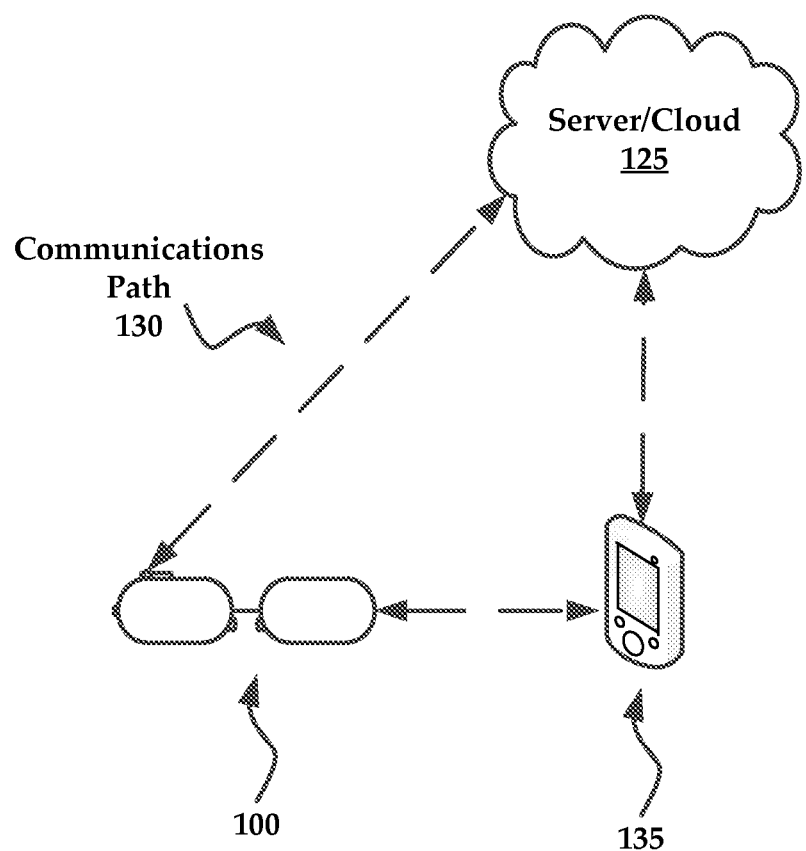
FIG. 3 is an schematic diagram of an exemplary device and server configuration in which embodiments of the present technology may be practiced.

Depending on the processing capabilities of the solution generation component 105, the solution generation component 105 may alone be capable of processing the determined task. In other instances, the solution generation component 105 may communicate the task to a server 125, which may utilize additional resources to process the task received from the solution generation component 105. FIG. 3 illustrates a plurality of user devices, which may communicatively couple with the server cloud 125 via a communications path 130.

In some instances, the functions of the server 125 may be implemented within a cloud-based computing environment and may be referred to as a "server cloud." In general, a cloud-based computing environment is a resource that typically combines the computational power of a large model of processors and/or that combines the storage capacity of a large model of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of servers, with each server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

It will be understood that the communications path 130 may include, but is not limited to, a wireless communications medium such as a cellular network or a WiFi connection. In other instances, the solution generation component 105 may communicate with the server cloud 125 via a proxy device 135, such as a cellular telephone. The solution generation component 105 may communicate with the proxy device 135 via, for example, a Bluetooth connection.

Depending upon the system utilized the solution generation component 105 or the server cloud 125 may generate a solution for the task. Indeed, the solution for the task may depend upon the particularities of the task, but in the example provided in FIG. 2, the solution 140 may comprise a final answer for the mathematical problem (e.g., task 120). In addition to providing a solution 140, the solution generation component 105 may also provide ancillary task/solution information. For example, the solution generation component 105 may determine an equation 145 that applies to the mathematical problem. Further information that may also be displayed includes, but is not limited to, a summary or explanation 150 of the mathematical equation.

Other information displayed may include step by step instructions or guidance on how the task was solved. In this case, it may include displaying the mathematical steps required to solve the problem. In some embodiments, the solution generation component 105 or server cloud 125 may provide a link to one or more resources that were used to solve the task.

In some embodiments, the solution 140, equation 145, and explanation 150 may variously be displayed on the lens 155 of the device 100. To prevent or reduce visual congestion, the solution generation component 105 may display this information proximate, but not overlapping the task. This overlay of information on the lens 155 creates an augmented view. Thus, other devices that are capable of overlaying information on a visible display, such as a head's up display unit, are likewise contemplated for use in accordance with the present technology.

In some instances, the logic executed by the solution generation component 105 is further operable to perform operations such as storing a task and solution pair in a database. Advantageously, instead of generating solutions for tasks that have already been solved, the solution generation component 105 may initially call on the server cloud 125 to query the database for a corresponding task/solution pair. Moreover, if a task is associated with multiple independent or differing solutions, the solution generation component 105 may provide one or more of the solutions, allowing the user to choose the best or most suitable solution.

In some instances, the solution generation component 105 may determine if the task either unsolvable or has an incomplete solution. Again, this information may be determined by attempting to solve the task or by querying the database to find a similar task. If it is determined that there is an incomplete solution for the task or that the task is unsolvable, the solution generation component 105 may generate and cause the display of a warning message to the user, such as "Warning: Incomplete Solution or Task Unsolvable."

In addition to the other ancillary types of information provided in response to a task, the solution generation component 105 may determine a field of endeavor associated with the task. For example, the solution generation component 105 may determine that a particular mathematical problem is unique to fluid dynamics. This information may be valuable to the user and thus may be displayed to the user.

In some instances, the solution generation component 105 may determine that an economic value is associated with the task. For example, the solution generation component 105 may determine that someone has offered a reward to complete a particular task. The solution generation component 105 may display descriptive information about the economic value for the task to the user.

The solution generation component 105 may also query the database(s) to determine how often a particular task has been solved (e.g., a frequency of occurrence of the task). The solution generation component 105 may also generate various scores for the task at hand, such as determining a complexity score that represents a complexity level for the task. A resource score may also be calculated that represents an amount of resources required to complete the task. This resource score may refer, for example, to an amount of computing resources that the server cloud 125 is required to dedicate to solving the problem, or duration of the use of said resources.

In some instances, the solution generation component 105 may be capable of sensing and/or tracking a focus of an eye of a user to determine a section of the view being looked at by the user. The bounds of the view may be determined by the view currently being captured by the image capturing device 110. That is, it can be assumed that the content within the view being captured by the image capturing device 110 includes a general location of the task within the view. A more specific location of the task within the view may be determined by tracking the focus of the eye (e.g., eye tracking), according to methods known to one of ordinary skill in the art.

The solution generation component 105 may then cause the image capturing device 110 to capture the section of the view being looked at by the user. This feature prevents the solution generation component 105 from analyzing tasks that are not being directly viewed by the user. With regard to the example provided in FIG. 2, the solution generation component 105 may track the focus of the eye of the user, which is currently viewing the task 120. If another task is included in the math test 115, but is located above or below the task 120 and happens to fall within the periphery of the lens 155, the solution generation component 105 may use the focus to select the desired task and provide a solution according to the processes described above.

Figure 4:
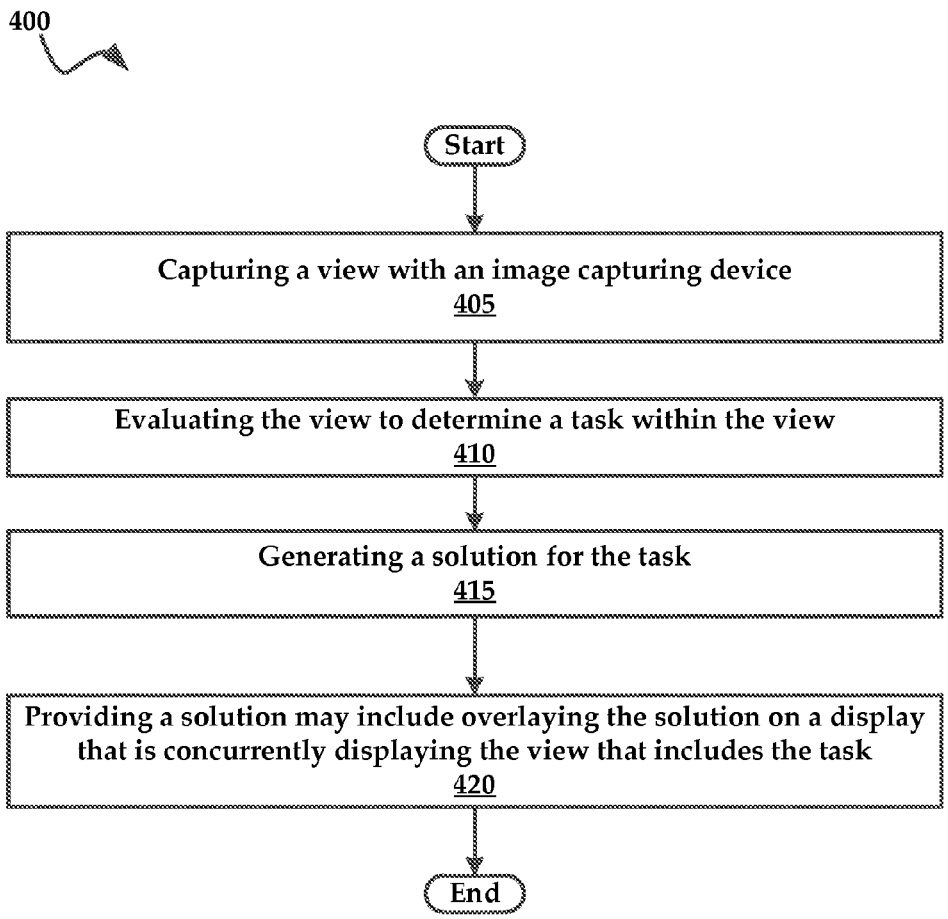
FIG. 4 is a flowchart of an exemplary method for generating and displaying a solution to a task.

FIG. 4 is a flowchart of an exemplary method for providing a solution to a task. The method 400 may be executed by a device, such as the device of FIGS. 1 and 2, or any device capable of capturing views of tasks and providing solutions to the determined tasks. Generally, the method 400 may comprise a step 405 of capturing a view with an image capturing device. A view may include, for example, a capture of an image or images via a camera or video recording application. A view may comprise a plurality of visual features that may be recognized by the present technology.

The method 400 may also include a step 410 of evaluating the view to determine a task within the view. Again, any one or combination of means for determining a task may be utilized. For example, if the task is a word problem, the task may be determined by applying optical character recognition to extract the words of the problem from the view. Additionally, natural language processing methods may be utilized to process the word problem and convert the word problem into a query that may be executed against one or more databases.

After determining one or more tasks included in the view, the method 400 may include a step 415 of generating a solution for the task. Next, the method may include a step 420 of providing the solution to an end user. As mentioned above, the step 420 of providing a solution may include overlaying the solution on a display that is concurrently displaying the view that includes the task. This solution/task display combination is generally referred to as an augmented reality view. In other instances, the solution may include a combination of solution overlay and/or audio output. For example, the solution may include a solution to a mathematical problem, while the audio output provides ancillary information such as the mathematical equation used, the field of endeavor, the complexity of the problem, or descriptive information regarding the steps used to generate the solution.

Figure 5:
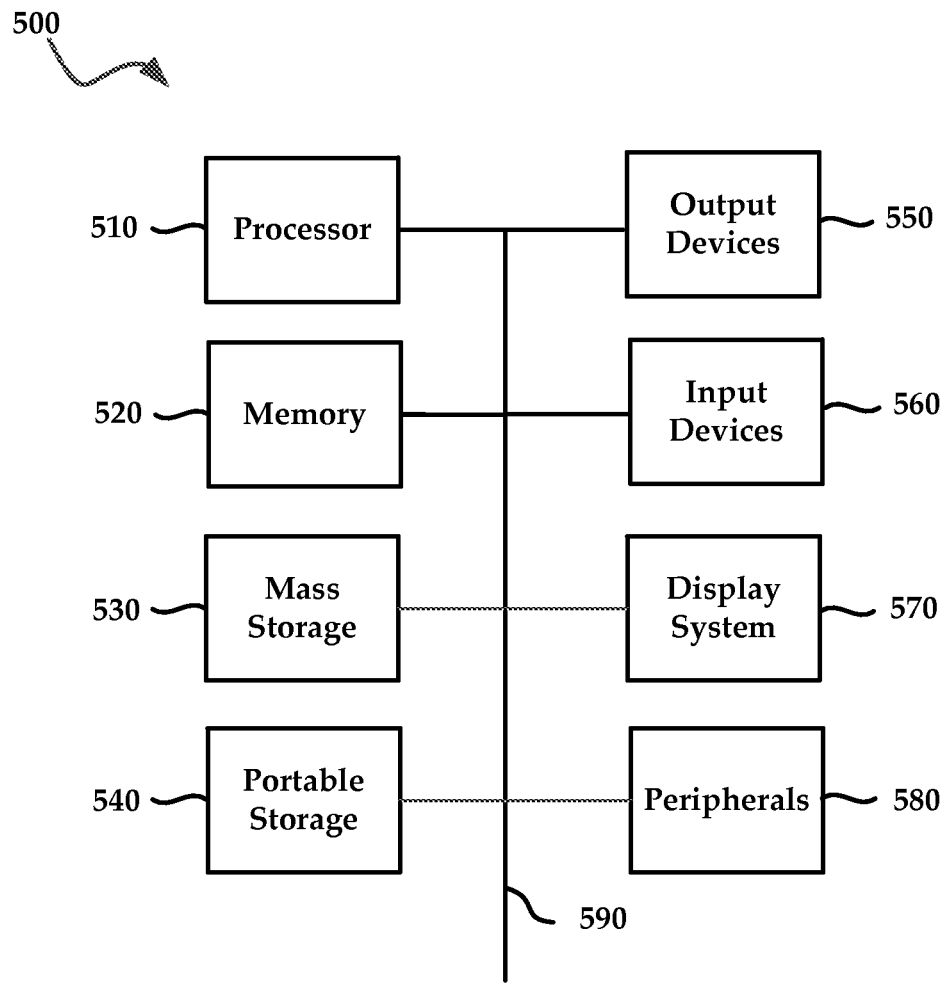
FIG. 5 illustrates an exemplary computing device that may be used to implement embodiments according to the present technology.

FIG. 5 illustrates an exemplary computing device 500 (also referred to as a computing system) that may be used to implement an embodiment of the present systems and methods. The system 500 of FIG. 5 may be implemented in the contexts of the likes of computing devices, networks, servers, or combinations thereof. The computing device 500 of FIG. 5 includes one or more processors 510 and main memory 520. Main memory 520 stores, in part, instructions and data for execution by processor 510. Main memory 520 may store the executable code when in operation. The system 500 of FIG. 5 further includes a mass storage device 530, portable storage device 540, output devices 550, user input devices 560, a display system 570, and peripheral devices 580.

The components shown in FIG. 5 are depicted as being connected via a single bus 590. The components may be connected through one or more data transport means. Processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 may store the system software for implementing embodiments of the present technology for purposes of loading that software into main memory 520.

Portable storage device 540 operates in conjunction with a portable non-volatile storage medium, such as a floppy disk, compact disk, digital video disc, or USB storage device, to input and output data and code to and from the computing system 500 of FIG. 5. The system software for implementing embodiments of the present technology may be stored on such a portable medium and input to the computing system 500 via the portable storage device 540.

User input devices 560 provide a portion of a user interface. User input devices 560 may include an alphanumeric keypad, such as a keyboard, for inputting alpha-numeric and other information, or a pointing device, such as a mouse, a trackball, stylus, or cursor direction keys. Additional user input devices 560 may comprise, but are not limited to, devices such as speech recognition systems, facial recognition systems, motion-based input systems, gesture-based systems, and so forth. For example, user input devices 560 may include a touchscreen. Additionally, the system 500 as shown in FIG. 5 includes output devices 550. Suitable output devices include speakers, printers, network interfaces, and monitors.

Display system 570 may include a liquid crystal display (LCD) or other suitable display device. Display system 570 receives textual and graphical information, and processes the information for output to the display device.

Peripherals device(s) 580 may include any type of computer support device to add additional functionality to the computer system. Peripheral device(s) 580 may include a modem or a router.

The components provided in the computing system 500 of FIG. 5 are those typically found in computer systems that may be suitable for use with embodiments of the present technology and are intended to represent a broad category of such computer components that are well known in the art. Thus, the computing system 500 of FIG. 5 may be a personal computer, hand held computing device, telephone, mobile computing device, workstation, server, minicomputer, mainframe computer, or any other computing device. The computer may also include different bus configurations, networked platforms, multi-processor platforms, etc. Various operating systems may be used including Unix, Linux, Windows, Mac OS, Palm OS, Android, iOS (known as iPhone OS before June 2010), QNX, and other suitable operating systems.

It is noteworthy that any hardware platform suitable for performing the processing described herein is suitable for use with the systems and methods provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be coupled with the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A device, comprising:
   one or more processors; and
   logic encoded in one or more tangible media for execution by the one or more processors and when executed operable to perform operations comprising:
      capturing a view with an image capturing device;
      tracking a focus of an eye of a user to determine a section of the view being looked at by the user, the view that is captured comprising the section of the view being looked at by the user;
      evaluating the view, the view comprising a task;
      detecting an additional task within a peripheral portion of the view;
      preventing the additional task from being analyzed based on the focus of the eye;
      identifying a field of endeavor of the task;
      determining contents of the task from the view;
      generating a solution for the contents of the task, using the field of endeavor of the task; and
      displaying the solution via a display device.

2. The device according to claim 1, wherein displaying includes overlaying the solution onto the view to create an augmented view.

3. The device according to claim 1, wherein the task includes a mathematical problem.

4. The device according to claim 1, wherein the logic when executed is further operable to perform operations comprising storing a task and solution pair in a database, the task and solution pair comprising the task and the generated solution for the task.

5. The device according to claim 1, wherein generating a solution comprises determining if the task is unsolvable or has an incomplete solution; wherein if the task is unsolvable or has an incomplete solution, a warning message is displayed.

6. The device according to claim 1, wherein the logic when executed is further operable to perform operations comprising determining an economic value associated with the task; and displaying the economic value via the display device.

7. The device according to claim 1, wherein the logic when executed is further operable to perform operations comprising determining a frequency of occurrence of the task.

8. The device according to claim 1, wherein the logic when executed is further operable to perform operations comprising generating a complexity score that represents a complexity level for the task.

9. The device according to claim 1, wherein the logic when executed is further operable to perform operations comprising generating a resource score that represents an amount of resources required to complete the task.

10. The device according to claim 1, wherein the logic when executed is further operable to perform operations comprising providing one or more steps required to generate the solution in a format that can be displayed on the display device.

11. A device, comprising:
    one or more processors; and
    logic encoded in one or more tangible media for execution by the one or more processors and when executed operable to perform operations comprising:
       tracking a focus of an eye of a user to determine a section of a view being looked at by the user, the view being determined by an image capturing device;
       capturing the section of the view being looked at by the user via the image capturing device;
       evaluating the section of the view, the view comprising a task;
       determining contents of the task from the view;
       detecting an additional task within a peripheral portion of the view;
       preventing the additional task from being analyzed based on the focus of the eye;
       receiving a natural language query that is related to the task;
       generating a solution for the contents of the task and the natural language query; and
       displaying the solution via a display device.

12. The device according to claim 11, wherein displaying includes overlaying the solution onto the view to create an augmented view.

13. The device according to claim 11, wherein the task includes a mathematical problem.

14. The device according to claim 11, wherein the logic when executed is further operable to perform operations comprising storing a task and solution pair in a database, the task and solution pair comprising the task and the generated solution for the task.

15. The device according to claim 11, wherein generating a solution comprises determining if the task is unsolvable or has an incomplete solution; wherein if the task is unsolvable or has an incomplete solution, a warning message is displayed.

16. The device according to claim 11, wherein the logic when executed is further operable to perform operations comprising determining an economic value associated with the task; and displaying the economic value via the display device.

17. A method for providing a solution to a task via a device comprising an image capturing device, the method comprising:
    capturing a view with an image capturing device by tracking a focus of an eye of a user to determine a section of the view being looked at by the user, the view that is captured comprising the section of the view being looked at by the user;
    evaluating the view, the view comprising a task;

detecting an additional task within a peripheral portion of the view;
preventing the additional task from being analyzed based on the focus of the eye;
determining contents of the task from the view;
generating a solution for the contents of the task;
providing one or more steps required to generate the solution in a format that can be displayed on a display device;
calculating a plurality of different solutions for the task;
providing the plurality of different solutions to an end user; and
receiving a selection of one of the plurality of different solutions from the end user as a best or most suitable solution.

\* \* \* \* \*